US007206760B1

(12) United States Patent
Carey et al.

(10) Patent No.: US 7,206,760 B1
(45) Date of Patent: Apr. 17, 2007

(54) METHOD OF SELECTING SECURITIES FOR A PORTFOLIO

(75) Inventors: Robert Carey, Naperville, IL (US); Greg McIntyre, Stamford, CT (US)

(73) Assignee: First Trust Portfolios L.P., Lisle, IL (US)

(*) Notice: Subject to any disclaimer, the term of this patent is extended or adjusted under 35 U.S.C. 154(b) by 0 days.

(21) Appl. No.: 09/480,724

(22) Filed: Jan. 7, 2000

(51) Int. Cl.
*G06F 17/60* (2006.01)
(52) U.S. Cl. .......................................... 705/35; 705/36
(58) Field of Classification Search ............ 705/35–37, 705/400, 10, 7, 412
See application file for complete search history.

(56) References Cited

U.S. PATENT DOCUMENTS

| 5,132,899 A | | 7/1992 | Fox ............................ 364/408 |
| 5,758,097 A | * | 5/1998 | Debe et al. .................... 705/12 |
| 5,761,442 A | | 6/1998 | Barr et al. .................... 395/236 |
| 5,784,696 A | | 7/1998 | Melnikoff ..................... 705/36 |
| 5,812,988 A | * | 9/1998 | Sandretto ..................... 702/179 |
| 5,819,238 A | | 10/1998 | Fernholz ....................... 705/36 |
| 5,857,176 A | * | 1/1999 | Ginsberg ...................... 705/36 |
| 5,884,287 A | | 3/1999 | Edesess ........................ 705/36 |
| 5,930,774 A | | 7/1999 | Chennault ..................... 705/36 |
| 5,978,778 A | * | 11/1999 | O'Shaughnessy ............ 705/35 |
| 6,035,286 A | | 3/2000 | Fried |
| 6,052,673 A | * | 4/2000 | Leon et al. .................... 705/35 |
| 6,161,099 A | | 12/2000 | Harrington et al. |
| 6,317,726 B1 | * | 11/2001 | O'Shaughnessy ............ 705/35 |

FOREIGN PATENT DOCUMENTS

WO  WO 00/73946 A1  * 12/2000

OTHER PUBLICATIONS

India: Financial ratios: Making sense of the numbers, Businessline; Islamabad; Dec. 26, 1999.*
Recoton Corporation Details Actions Under Its Comprehensive Business Plan Business Wire; New York; Aug. 16, 1999; Business Editors.*
N&B's Genesis Fund is Full of Stocks That Are Real Snoozers / And that's the way portfolio manager Judy Vale wants it San Francisco Chronicle (Pre-1997 Fulltext); San Francisco, Calif.; Oct. 28, 1996; Herb Greenberg.*
Is your bank in financial trouble? The Journal of Bank Cost & Management Accounting; San Francisco; 1994; Streuly, Carolyn.*
Banking industry dynamics and implications for hospitals Topics in Health Care Financing; Gaithersburg; Summer 1993; Scarborough, Sydney P.*
Nasdaq-100 Index Tracking Stock Celebrates First Year, PR Newswire; New York; Mar. 28, 2000.*
Morning Mutual Funds: Nasdaq 100 index spells exitement: Top funds try to match its performance or beat it with leverage—Detroit News; Detroit, Mich; Dec. 31, 1998.*
Nasdaq Traders "Nasdaq-100 Updates", Dec. 4, 1998, (total of 3 pages).*
Network Solutions "Network Solutions Named to Nasdaq 100 Index Begins Trading on Index Monday, Dec. 20, 1999", Dec. 14, 1999, (total of 2 pages).*

* cited by examiner

*Primary Examiner*—Hyung Sough
*Assistant Examiner*—Harish T. Dass
(74) *Attorney, Agent, or Firm*—McAndrews, Held & Malloy, Ltd.

(57) ABSTRACT

A method is provided for selecting a portfolio of securities for investment purposes. Specifically, the method utilizes three types of securities-related data: price appreciation, return-on-assets ratio, and price-to-cashflow ratio. A group of securities is ranked by price appreciation, return-on-assets ratio, and price-to-cashflow ratio; a number of the securities having the highest average rank are selected for investment.

20 Claims, 1 Drawing Sheet

METHOD OF SELECTING SECURITIES FOR A PORTFOLIO

BACKGROUND OF THE INVENTION

The present invention generally relates to a method for selecting a securities portfolio for investment. More particularly, the present invention relates to an investment strategy for selecting a securities portfolio based upon three criteria: price appreciation, return on assets ratio, and price-to-cashflow ratio. The investment objective of the method of the present invention is to provide an above-average total return from the portfolio. The method of the present invention seeks to meet this objective through capital appreciation.

A unit investment trust (UIT) is a professionally selected, diversified portfolio of stocks, bonds, or other securities that remains as a fixed portfolio throughout the life of the trust. Investors in a UIT purchase units, which represent an undivided ownership in the entire portfolio. Unlike mutual funds, in which the portfolio is actively managed and traded and continuously changes, UITs generally remain fixed for a predetermined period of time. Portfolios are designed to fill a variety of investment needs and risk tolerance levels. They fall into primarily two categories, equity and fixed income.

Equity portfolios are typically classified as either strategies or sectors. Strategy portfolios follow predetermined investment criteria for selecting the stocks for the portfolio. All strategies have three inherent qualities:

1. Simplicity: The strategies seek to out-perform specified indices by selecting portfolios using sound, fundamental screens that reflect the historical behavior of the securities.

2. Resilience: The strategies must show back-tested results and have staying power even through bear markets.

3. Discipline: The strategies dictate which stocks are chosen for the portfolio; no emotional judgments are made and the strategies always remain the same.

Heretofore, investment strategies have been illustrated in U.S. Pat. No. 5,978,778 issued to O'Shaughnessy on Nov. 2, 1999 and U.S. Pat. No. 5,132,899 issued to Fox on Jul. 21, 1992. However, these investment strategies are not the same as the method of the present invention.

SUMMARY OF THE INVENTION

It is an object of the present invention to provide a novel security selection investment strategy. It is also an object of the present invention to automate the investment strategy of the present invention.

These and other objects of the present invention are accomplished in a security selection method that seeks to outperform a typical index by adhering to a disciplined investment process. The first step in this strategy is defining the universe of securities for potential investment. In one embodiment of the present invention, the method begins with using a database of stocks of companies listed in the Nasdaq 100 Index, which represents the largest non-financial domestic companies listed on the Nasdaq Stock Market's National Market. However, the present invention is not intended to be limited to just the Nasdaq 100 Index, or even to stocks; any type of security meeting the selection criteria may be utilized. Moreover, the present invention is not limited to any particular database of securities; any group of securities, including one developed by the user of the present method, could be substituted for the Nasdaq 100 Index of stocks.

The present method then selects securities from the group of securities based upon three criteria: price appreciation, return on assets ratio, and price-to-cashflow ratio. The first step involves screening for consistent growth by looking at the securities' price appreciation. Securities may be evaluated by determining their statistical rates of price appreciation over various periods of time. A variety of statistical analyses, including least squares regression analysis, may be applied in evaluating the price history of each security. In one exemplary embodiment of the present invention, least squares regression analysis is performed to determine a statistical rate of appreciation of each security over both six-month and one-year periods. These securities may then be ranked by both these six-month and one-year statistical rates of appreciation.

The second step of the present method focuses on profitability. Securities are screened for profitability by ranking the securities in the group based on their return on assets. Return on assets is computed by dividing net income by total assets.

Lastly, the securities are screened for value by ranking them based on their price-to-cashflow ratios. Cashflow is computed by adding income (before extraordinary items) to depreciation and amortization. The price-to-cashflow ratio is computed by dividing the market value of the security by total cashflow.

These and other features of the present invention are discussed or are apparent in the following detailed description of the preferred embodiments of the invention.

DETAILED DESCRIPTION OF THE PREFERRED EMBODIMENTS

Figure 1:
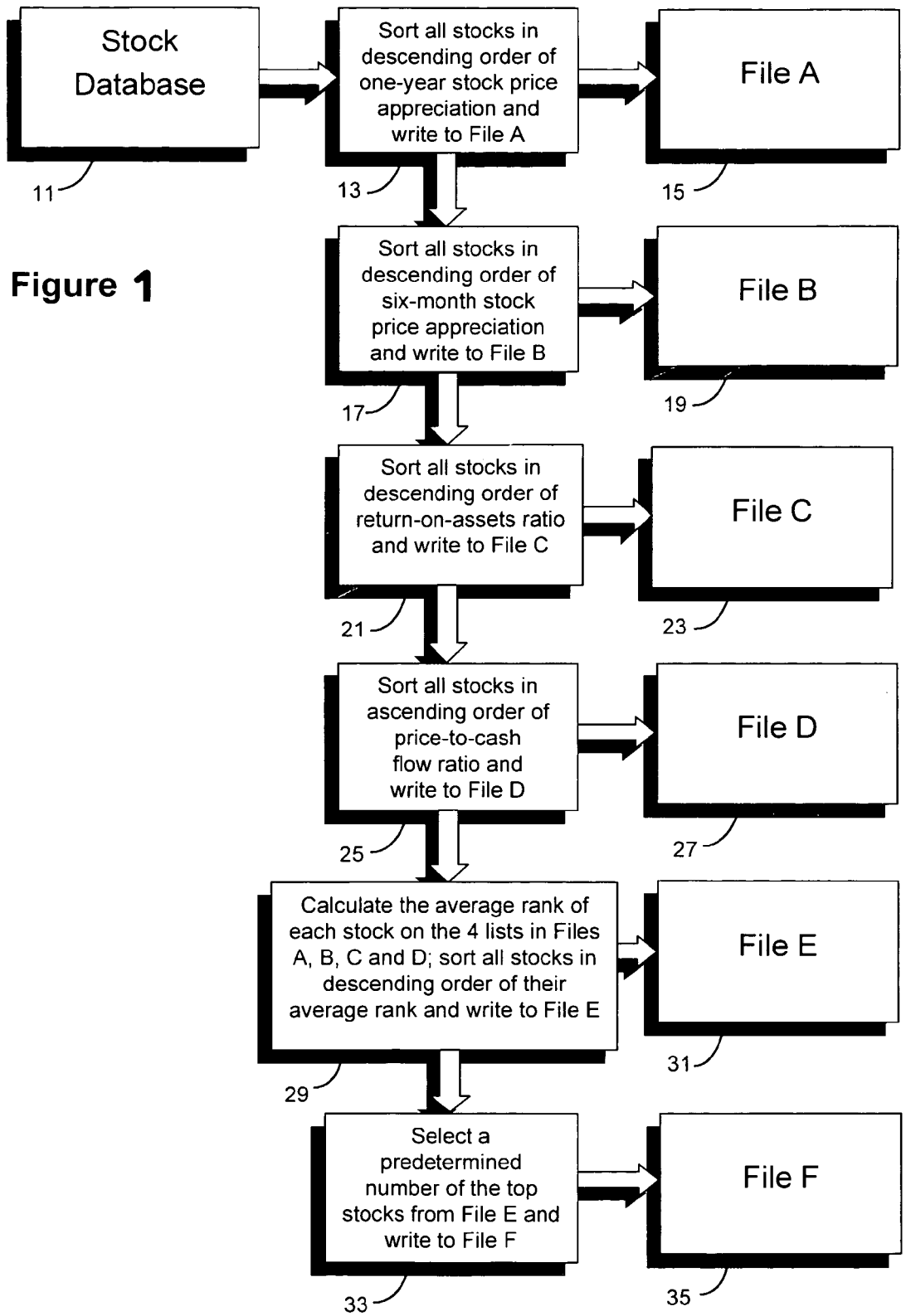
FIG. 1 a schematic flow chart depicting the steps in an exemplary method of selection of securities.

Referring to the FIGURE, a stock database 11 is formed by input of data using a conventional personal computer (not shown). The data input includes the names of, or a representation of, the one hundred (100) stocks that make up the Nasdaq 100 index. The names of the 100 stocks, or their symbols or other representative indicia, are stored in the database 11.

In addition to the identity of the 100 stocks, other data related to each stock may also be stored in the database 11 in association with its respective stock name. Such information may include (1) the price appreciation, (2) the return-on-assets ratio, and (3) the price-to-cashflow ratio.

In the step indicated by the diagram block 13, the stocks in the database 111 are sorted, or organized, according to the magnitude of the stock's one-year price appreciation value ("PAV"). Least squares regression analysis of the monthly price history of each security over the preceding 12 months is performed in computing the one-year PAV. The sorting may be done by organizing the stocks in descending order of the one-year PAV. The sorted stock names are written to File A, as shown in the diagram block 15.

As understood, the only items of information necessary to create File A are the 100 stock names (or representations of the 100 stocks) and the one-year PAV for each stock. That information may be initially stored in database 11.

In addition, the step indicated by diagram block 17 is performed in which the stocks are sorted, or organized, according to the magnitude of the stock's six-month price appreciation value ("PAV"). Least squares regression analysis of the monthly price history of each security over the preceding 6 months is performed in computing the six-month PAV. The sorting may be done by organizing the stocks in descending order of the six-month PAV. The sorted stock names are written to File B, as shown in diagram block 19. The six-month stock price appreciation information may be initially stored in the database 11 such that stocks from that database are sorted (diagram block 17) and written to File B (diagram block 19). Alternatively, the stocks in File A could be associated with a six-month PAV such that they could be sorted (diagram block 17) and written to File B (diagram block 19).

The step indicated by diagram block 21 is performed in which the stocks are sorted, or organized, according to the magnitude of the company's return-on-assets ratio, computed by dividing net income by total assets. The sorting may be done by organizing the stocks in descending order of return-on-assets ratio. The sorted stock names are written to File C, as shown in diagram block 23. The return-on-assets ratio information may be initially stored in the database 11 such that stocks from that database are sorted (diagram block 21) and written to File C (diagram block 23). Alternatively, the stocks in Files A or B could be associated with a return-on-assets ratio such that they could be sorted (diagram block 21) and written to File C (diagram block 23).

The step indicated by diagram block 25 is performed in which the stocks are sorted, or organized, according to the magnitude of the company's price-to-cashflow ratio, computed by dividing the market value of the stock by total cashflow. The sorting may be done by organizing the stocks in ascending order of price-to-cashflow ratio. The sorted stock names are written to File D, as shown in diagram block 27. The price-to-cashflow ratio information may be initially stored in database 11 such that stocks from that database are sorted (diagram block 25) and written to File D (diagram block 27). Alternatively, the stocks in Files A, B, or C could be associated with a price-to-cashflow ratio such that they could be sorted (diagram block 25) and written to File D (diagram block 27).

After File D has been completed, the step indicated by diagram block 29 is performed in which the stocks are sorted, or organized, according to the magnitude of the company's average rank on the four lists in Files A, B, C, and D. (For example, a stock that happened to be ranked first in Files A and B, i.e., happened to have the greatest one-year and six-month PAVs, and was ranked second in Files C and D, i.e., had the second highest return-on-assets ratio and the second lowest price-to-cashflow ratio, would have an average rank of (1+1+2+2)/4 or 1.5.) The sorting may be done by organizing the stocks in descending order of their average rank. (A stock with an average rank of 1.5 would be listed ahead of a stock with an average rank of 2.0, etc.) The sorted stock names are written to File E, as shown in diagram block 31.

After File E has been completed, the step indicated by diagram block 33 is performed in which a desired number (for example, fifteen) of stocks from File E with the greatest average rank on the four lists in Files A, B, C, and D are selected. Since the stocks are sorted in File E in descending order of their average rank, this selection is performed by identifying the first 15 stocks in the ordered list. As will suggest itself, other modes of selection may be used.

The identities of those 15 stocks are stored in File F, as shown at diagram block 35. As understood, File F may be a file different from File E, or non-selected stocks in File E may be deleted to form File F.

In an exemplary embodiment, a portfolio of the top 15 stocks of File F will represent one series of a unit investment trust. With the deposit of the selected shares of stock, a percentage relationship among the securities in the trust's portfolio is established. In an exemplary embodiment, the selected securities are weighted by market capitalization subject to the restriction that no stock will comprise less than 1% or more than 25% of the portfolio on the business day prior to the initial date of deposit of said trust.

The trust will terminate on a mandatory termination date, which will typically be approximately 13 months from the initial date of deposit. Twelve-month termination dates are also contemplated. However, the duration of the investment vehicle is not limited to any particular length of time.

Some possible features and benefits of such a unit investment trust or other pooled vehicle or investment account can be summarized as follows (although these are not essential features of the present invention):

Known Portfolio
The present method produces a specific portfolio giving investors the comfort of knowing what they own.

Diversification
Portfolios produced by the present method can be diversified across many different securities, offering a portfolio for almost every asset allocation need.

Low Expenses
Portfolios selected pursuant to the present method offer significantly lower expenses than other packaged products.

Daily Liquidity
Units may be redeemed on any business day at the redemption price, which may be more or less than the original purchase price. There is no cost to liquidate.

Professional Portfolio Selection and Supervision
Once the portfolio is chosen, the holdings of the portfolio are supervised, eliminating the need of individual investors to oversee each security.

Fully Invested in the Market
Portfolios selected pursuant to the present method have limited cash positions so more of the investor's money is working in the market.

Ease of Ownership
With one low minimum purchase, investors can own a diversified portfolio of securities without making a substantial commitment of time or capital.

The method of the present invention is not limited to the selection of securities for funding a unit investment trust. Securities may be selected for funding any type of pooled investment vehicle or investment account. The present invention could also be used in connection with variable annuities, open-ended mutual funds, etc.

Utilizing the Nasdaq 100 Index, under present market conditions the selected portfolio would tend to be concentrated in technology stocks. Technology companies are generally subject to the risks of rapidly changing technologies; short product life cycles; fierce competition; aggressive pricing; frequent introduction of new or enhanced products; the loss of patent, copyright and trademark protections; and government regulation. Technology companies may be smaller and less experienced companies, with limited product lines, markets or financial resources. Technology company stocks have experienced extreme price and volume fluctuations that are often unrelated to their operating performance.

In an exemplary embodiment, the following Table would illustrate one possible selected portfolio:

TABLE

| Number of Shares | Issuer of Security | % of Aggregate Offering Price | Market Value per Share ($) | Cost of Securities to Trust ($) | Market Capitalization (in million $) |
|---|---|---|---|---|---|
| 62 | Adobe Systems | 2.78 | 66.500 | 4123 | 7993 |
| 262 | Amgen | 13.83 | 78.375 | 20534 | 39971 |
| 84 | Apple Computer | 4.41 | 77.875 | 6542 | 12529 |
| 51 | Atmel Corp. | 1.25 | 36.438 | 1858 | 3652 |
| 77 | Biogen | 3.64 | 70.188 | 5405 | 10550 |
| 50 | CMGI | 3.53 | 104.875 | 5244 | 9996 |
| 37 | Comverse Technology | 2.70 | 108.250 | 4005 | 7716 |
| 26 | Microchip Technology | 1.07 | 61.313 | 1594 | 3118 |
| 743 | Oracle | 22.96 | 45.875 | 34085 | 65311 |
| 46 | Siebel Systems | 3.11 | 100.313 | 4614 | 9290 |
| 376 | Sun Microsystems | 24.98 | 98.625 | 37083 | 76982 |
| 200 | Telllabs | 8.22 | 61.000 | 12200 | 23929 |
| 35 | VISX | 1.58 | 67.250 | 2354 | 4288 |
| 74 | Vitesse Semiconductor | 20.6 | 41.375 | 3062 | 6350 |
| 79 | Xilinx | 3.88 | 72.875 | 5757 | 11518 |

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

The invention claimed is:

1. A computer-implemented method for selecting securities from a group of available securities for an investment portfolio, comprising:

said computer performing the steps of calculating price appreciation for each of said available securities;

calculating a return on assets ratio for each of said available securities;

calculating a price to cashflow ratio for each of said available securities;

ranking at least some of the available securities to form a group of ranked securities, said ranking comprising ranking according to said price appreciation to assign each of said available securities one or more separate price appreciation ranks, ranking according to said return on assets ratio to assign each of said available securities a separate return on assets ratio rank, ranking according to said price to cashflow ratio to assign each of said available securities a separate price to cashflow rank, and determining for each of said available securities an average rank comprising the average of the one or more separate price appreciation ranks, separate return on assets ratio rank and separate price to cashflow rank for said security; and selecting at least some of the ranked securities to form a group of selected securities; wherein at least one of the steps of calculating, ranking, and selecting is carried out by a computer.

2. The method of claim 1 wherein said group of available securities comprises 100 stocks of the Nasdaq 100 index.

3. The method of claim 1 wherein said calculating price appreciation comprises calculating a first rate of price appreciation over a first predetermined time period and a second rate of price appreciation over a second predetermined time period different than said first predetermined time period, wherein said ranking the available securities according to said price appreciation comprises ranking the available securities according to said first rate so that each of said available securities is assigned a separate first rate rank and ranking the available securities according to said second rate so that each of said available securities is assigned a separate second rate rank, and wherein said determining comprises determining for each of said available securities an average rank comprising the average of the separate first rate rank, the separate second rate rank, the separate return on assets ratio rank and the separate price to cashflow ratio rank.

4. The method of claim 1 wherein said at least some of the available securities is ranked solely according to said price appreciation, said return on assets ratio and said price to cashflow ratio.

5. The method of claim 1 wherein said ranking further comprises ranking said at least some of the available securities according to capitalization of said available securities.

6. The method of claim 1 wherein said selecting comprises selecting a predetermined number of said ranked securities.

7. The method of claim 6 wherein said predetermined number is 15 or less.

8. The method of claim 1 wherein said calculating price appreciation comprises calculating a first rate of price appreciation over a first predetermined time period.

9. The method of claim 8 wherein said calculating a first rate comprises performing a regression analysis of the price history of each of the available securities over said first time period.

10. The method of claim 9 wherein said calculating price appreciation further comprises calculating a second rate of price appreciation over a second predetermined time period different from said first predetermined time period.

11. The method of claim 10 wherein said calculating a second rate comprises performing a regression analysis of the price history of each of the available securities over said second time period.

12. The method of claim 11 wherein said regression analysis comprises least squares regression analysis.

13. The method of claim 1 wherein said method further includes purchasing at least some of said group of selected securities to form a group of purchased securities.

14. The method of claim 13 wherein said purchased securities are weighted by market capitalization.

15. The method of claim 13 wherein said method further includes creating a unit investment trust comprising said purchased securities.

16. The method of claim 15 wherein said unit investment trust has a life of 13 months or more.

17. The method of claim 13 wherein said method further includes creating a pooled investment vehicle comprising said purchased securities.

18. The method of claim 13 wherein said method further includes creating a variable annuity comprising said purchased securities.

19. The method of claim 13 wherein said method further includes creating an investment account comprising said purchased securities.

20. A computer-readable medium bearing a computer program containing instruction steps such that upon installation of said computer program in a general purpose computer, the computer performs a method for selecting securities from a group of available securities for an investment portfolio comprising the operations of:

calculating price appreciation for each of said available securities;

calculating a return on assets ratio for each of said available securities;

calculating a price to cashflow ratio for each of said available securities;

ranking at least some of the available securities to form a group of ranked securities, said ranking comprising ranking according to said price appreciation to assign each of said available securities one or more separate price appreciation ranks, ranking according to said return on assets ratio to assign each of said available securities a separate return on assets ratio rank, ranking according to said price to cashflow ratio to assign each of said available securities a separate price to cashflow rank, and determining for each of said available securities an average rank comprising the average of the one or more separate price appreciation ranks, separate return on assets ratio rank and separate price to cashflow ratio rank for said security; and selecting at least some of the ranked securities to form a group of selected securities.

* * * * *

UNITED STATES PATENT AND TRADEMARK OFFICE
CERTIFICATE OF CORRECTION

| | | |
|---|---|---|
| PATENT NO. | : 7,206,760 B1 | |
| APPLICATION NO. | : 09/480724 | |
| DATED | : April 17, 2007 | |
| INVENTOR(S) | : Robert Carey et al. | |

It is certified that error appears in the above-identified patent and that said Letters Patent is hereby corrected as shown below:

Claim 1:

Column 5, line 48, cancel the phrase "said computer is performing the steps of" and remove it from the claim.

Signed and Sealed this

Twenty-sixth Day of June, 2007

JON W. DUDAS
*Director of the United States Patent and Trademark Office*